Jan. 8, 1935.  F. W. HECKERT  1,986,971

FUEL SYSTEM UNIT

Filed July 5, 1932  2 Sheets-Sheet 1

INVENTOR,
Frederick W. Heckert,
BY Howard S. Smith
His ATTORNEY

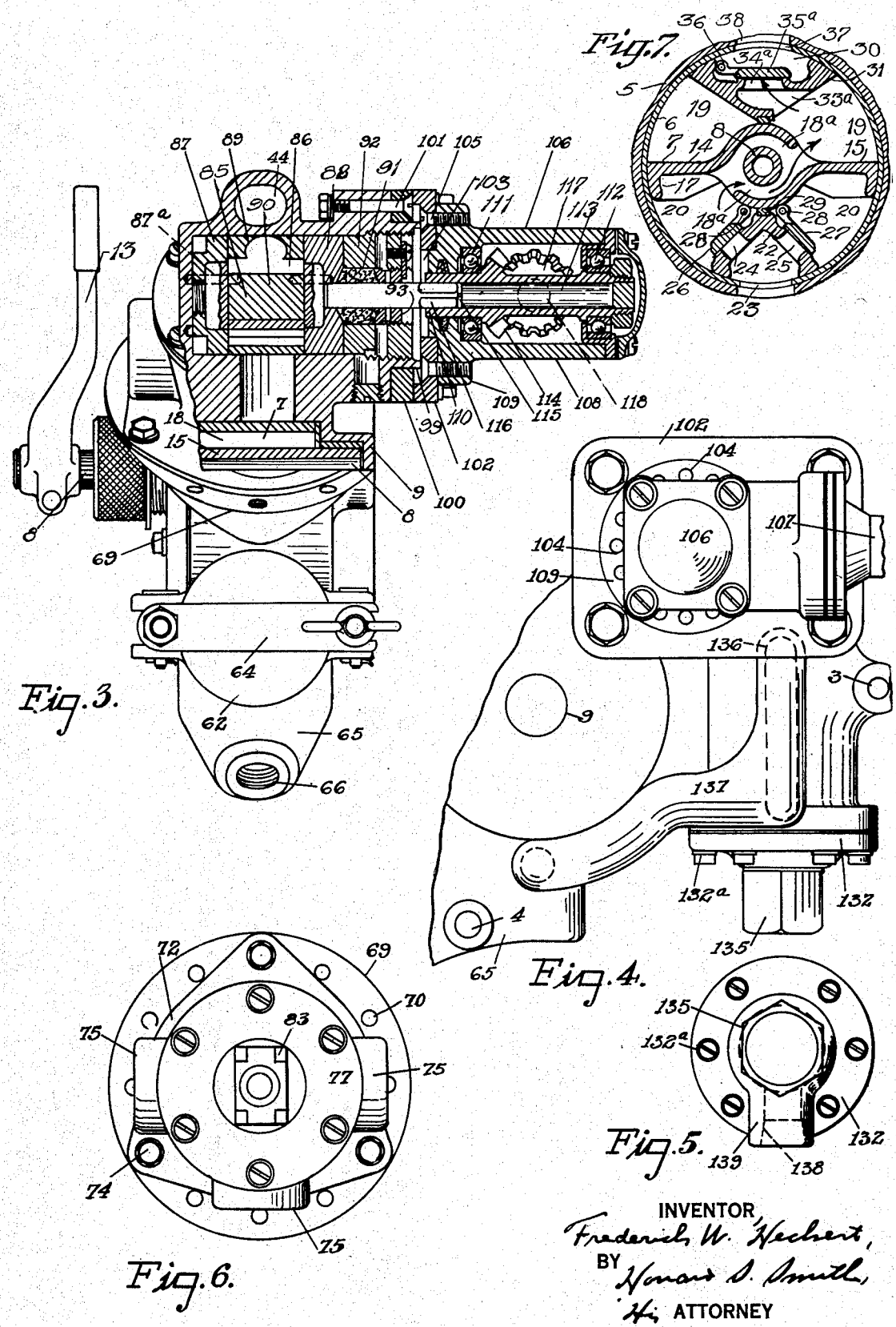

Patented Jan. 8, 1935

1,986,971

UNITED STATES PATENT OFFICE 1,986,971

FUEL SYSTEM UNIT

Frederick W. Heckert, Oakwood, Ohio

Application July 5, 1932, Serial No. 620,965

10 Claims. (Cl. 103—4)

This invention relates to new and useful improvements in fuel system units especially adapted for aircraft.

It is one of the principal objects of my invention to provide a simple, compact, light weight and efficient fuel system unit combining into one centralized unit the several elements required in a pump feed fuel system for aircraft.

It is another object of my invention to provide a fuel control cock, strainer, hand starting and emergency wobble pump, power driven rotary pump, bellows-type relief valve and poppet type by-pass valve so arranged as to obtain the shortest and most direct flow of fuel from the cock inlet ports to the power driven pump discharge without fuel traps.

It is another object of my invention to provide suitable adapters to drive the power driven rotary pump by a flexible shaft, hydraulic motor or electric motor, or other suitable available power means.

It is another object of my invention to provide a fuel control cock that is readily attached to the main housing in a manner that will allow it to be set in a number of positions at an angle of 45 degrees from the vertical to facilitate connecting the fuel lines from the fuel tanks and extending a remote cock control to the pilot's cock-pit.

It is another object of my invention to provide means to permit the removal of the fuel cock from the unit and substitute other type cocks, or to operate the unit satisfactorily without a fuel cock directly attached to it.

Another object of my invention is to provide a unit of several elements, assembled in such a manner that replacement of parts can be readily effected, thus facilitating field repairs and eliminating the necessity for rejection of the entire unit.

Other important and incidental objects will be brought out in the following specification and particularly set forth in the claims annexed thereto.

Figure 2:
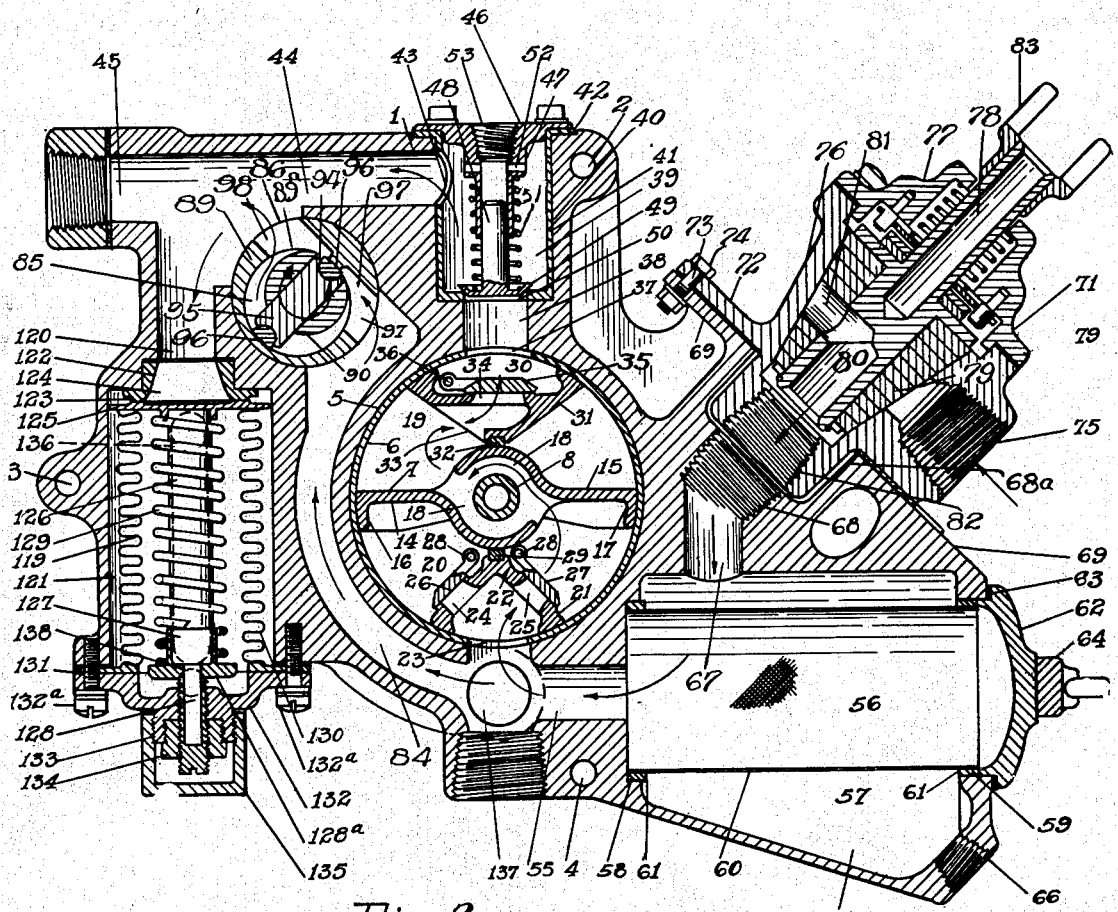
Figure 1:
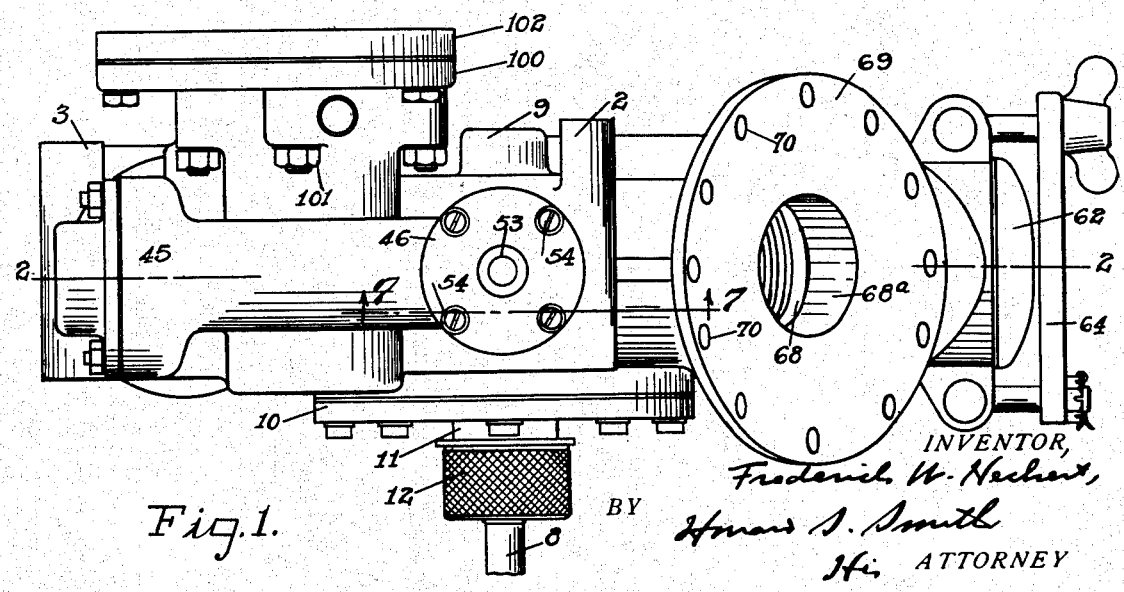

In the accompanying drawings illustrating my invention, Figure 1 is a plan view of the unit with the fuel cock removed. Figure 2 is a cross-sectional view taken through the unit on the line 2—2 of Figure 1, showing the fuel cock attached to the unit. Figure 3 is a rear view of the unit, partially broken away to show the power driven fuel pump and its drive mechanism in section. Figure 4 is a partial side view of the unit, showing the power driven fuel pump and relief valve by-pass to the hand pump inlet. Figure 5 is a bottom view of the bellows relief valve cover, showing the connection for the carburetor air duct for supercharged engines. Figure 6 is an end view of the fuel cock, showing the position of the various inlet ports and flange drilling to permit indexing the latter. And Figure 7 is a sectional view taken through the piston and valves on the line 7—7 of Figure 1.

Referring to the drawings for a detailed description of my invention, the numeral 1 designates a main housing, preferably made of cast aluminum alloy, and provided with mounting bosses 2, 3 and 4 spaced on the outer surface of the housing.

In the center of the housing 1 there is a large axial bore 5 fitted with a liner 6, preferably of bronze, for a hand-operated wobble pump impeller 7. This impeller is secured upon a shaft 8, concentric with the bore 5 and liner 6, and has one end journalled in a boss 9 formed integral with the housing 1 and on one side thereof.

The opposite end of the shaft 8 projects through a cover plate 10 in which it is journalled, and has fitted to a boss 11 integral with the latter, a packing gland nut 12. The extreme outer end of this shaft, where it projects beyond the nut 12, is serrated and fitted with a lever arm 13 by which the impeller 7 may be oscillated through a linkage (not shown) from the pilot's cock pit.

The impeller 7 has two oppositely disposed arms 14 and 15, whose outer ends, where they contact the liner, are formed with downwardly extending arcuate flanges 16 and 17 respectively. (See Figure 2). As shown in Figures 2 and 7, this impeller is provided with two oppositely disposed parts 18 and 18ª extending through it. These parts are positioned adjacent each other axially and comprise cored passages extending through the hub portion 7ª of the impeller 7 and surrounding the shaft 8. Each of the ports 18 and 18ª thus formed communicates with a divided discharge chamber 19 above the impeller and a divided suction chamber 20 below the latter. (See Figures 2 and 7.)

Secured in the suction chamber 20 below the impeller 7 is an inlet valve box 21, comprising an inverted yoke 22 positioned over an inlet port 23 in the liner 6 below the shaft 8. In the oppositely inclined sides of the yoke 22 are ports 24 and 25 communicating with the chamber 20 above the valve box and the inlet port 23 below it.

The ports 24 and 25 are adapted to be closed by check valves 26 and 27 pivoted to pins 28, 28 mounted on the cover 10. At its vertex the valve box is provided with an axial groove in which there is positioned a packing strip 29 to render liquid tight the contact between the valve box and the outer concentric face of the impeller arm 14. (See Figure 2.)

The port 24 communicates with that portion of the suction chamber 20 which serves the port 18 through the impeller 7, and the port 25 communicates with that portion of the suction chamber 20 which serves the port 18ª through the impeller 7. (See Figures 2 and 7.)

Above the impeller in the discharge chamber 19, is a discharge valve assembly 30 having a valve body 31 whose lower center portion is fitted with a packing strip 32 to form an effective liquid-tight seal between the valve assembly and the top concentric face of the impeller arm 15. (See Figure 2.)

Provided in one of the lower inclined faces of the valve body 31 and above the port 18 is a passage 33 which communicates with a discharge port 34 formed in the top of the valve body and that portion of the discharge chamber 19 separated from the port 18ª by the packing strip 32. (See Figure 2.)

Formed in the opposite lower inclined face of the valve body 31 and above the port 18ª there is another passage 33ª adjacent the passage 33 and communicating with another discharge port 34ª adjacent the port 34 and likewise formed in the top of the valve body. This passage 33ª communicates with that portion of the discharge chamber 19 into which the port 18ª discharges. (See Figure 7.)

Each of the ports 34 and 34ª is fitted with an independent check valve 35 and 35ª pivoted on pins 36, 36 likewise secured to the cover 10. Now, when the impeller 7 is oscillated, liquid will be drawn alternately through the ports 24 and 25 into the divided chamber 20 through the ports 18 and 18ª into the divided chamber 19, and thence alternately discharged through the ports 34 and 34ª, a port 37 in the cage 6 and a passage 38 to a check valve unit 39. (See Figures 2 and 7.)

This check valve unit 39 is removable as a whole, comprising a cage 40 preferably made of bronze, and received by a bore 41 concentric with the passage 38 and in the top of the housing 1.

At its upper end the cage is provided with a flange 42 and in its side wall, below the flange, with a lateral port 43 that communicates with a lateral passage 44 to a discharge flange 45 in the front of the housing 1. (See Figure 2.)

Fitted in the top of the cage 40 is a flanged cover 46 that has a depending boss 47 bored to provide a guide for the stem 48 of a check valve 49. This valve effectively closes a port 50 in the bottom of the cage 40 in alinement with the passage 38.

Surrounding the stem 48, and a reduced portion of the boss 47, is a helical compression spring 51, to effectively hold this valve closed when the hand pump is not in operation.

The boss 47 above the stem 48, is provided with radial ports 52, and, in the top of the cover, with a threaded hole 53 communicating with the latter and to which the gasoline pressure gage line may be attached.

The valve cage and cover are secured to the housing 1 by screws 54, passing through both members and received by threaded holes in the housing. In case of defects in the check valve, it may be removed as a unit and repaired or replaced without disturbing the other elements.

Below the hand pump the port 23 communicates with an inlet passage 55 from a strainer unit 56 contained within a low, rearwardly extending, cylindrical recess 57 in the housing 1. This recess, at its inner end, is provided with a counter bore 58, and at its outer end, with a restricted opening 59 in which there is fitted a cylindrical strainer screen 60 having end rings 61 that are received by the counter bore 58 and opening 59.

At its rear end the recess 57 and the end of the cylindrical screen are closed by a flanged cover 62 provided with a gasket 63 and held in place by a swing clamp bar 64 in contact with its outer face. (See Figure 2.) This strainer unit, if clogged or defective, may also be easily removed without disturbing the other units.

Below the strainer unit the housing 1 is formed with a downwardly sloping cavity 65 in whose lower end is a threaded boss 66 to receive a drain plug (not shown). Above the strainer, an inlet passage 67 to the strainer unit terminates in a threaded hole 68 in the bottom of a counter-bore 68ª formed in the rear inclined face 69 of the housing 1. This inclined face 69 is circular, as shown at Figure 6, and is provided about its periphery with equally spaced holes 70, in this case twelve, to receive a three-way fuel cock unit 71. The latter has a flange 72 and three corresponding holes 73 that register with the holes 70 to receive therethrough bolts 74 by which it is attached to the flange 69. This fuel cock has three inlet ports 75 as shown at Figure 6, and in order to effect the most direct connections with the various fuel tanks, the unit may be adjusted to the desired angle through the holes 70 and 73.

The valve unit is conventional in form, particularly for aeronautical work, and comprises a conical body 76 flanged at its outer end and provided with a cover 77 in which there is journalled a valve stem 78. Within the body 76 the stem is enlarged, being provided with a tapering, laminated valve 79, preferably of cork and secured upon the enlarged portion of the stem 78.

The valve 79 has an axial passage 80 communicating with a radial port 81 and discharging through a port 82 in alinement with the hole 68. Now, when the valve is rotated to bring the radial port 81 into registry with one of the ports 75, passage for the fuel will be provided through the fuel cock to the strainer.

As shown in Figure 2, the valve is in the closed position and adapted to be rotated by a yoke 83 secured to the end of the valve stem where it projects through the cover 75. This yoke is engaged by a similar fitting (not shown) on the fuel control shaft that projects downwardly from the instrument panel.

Connected with the inlet passage 55, below the port 23, is a by-pass 84 passing upwardly around the hand pump to a power driven vane type fuel pump unit 85 positioned in the upper forward portion of the housing and below the passage 44, to which it discharges. This pump unit is removable as a whole and is fitted in a bore 86 in the housing 1, parallel with the bore 5.

The pump unit comprises front and rear bronze bearings 87 and 88 fitted in the bore 86 and between which there is secured a steel liner 89. Rotatable within the liner 89 is a shaft 90 that is journaled in both bearings and extends rearwardly through a conventional shaft packing 91 in a bearing lock nut 92 and retained by a gland nut 93 received by a threaded recess in the nut 92.

Where the shaft 90 extends into the steel liner 89, it is rotatable within an eccentric bore 89ª in the latter, and has a transverse slot 94 in which there is slidably mounted a solid bronze vane 95. This vane is adapted to move through the shaft when the latter is rotated, extending fully across the bore 89ª and actuated by it.

Where the ends of the vane 95 contact the walls of the eccentric bore, they are fitted with steel rockers 96, 96 to provide a yieldable self-aligning contact with the liner walls.

Fuel is admitted to the inlet side of the pump through an inlet port 97 communicating with the upper end of the by-pass 84 and with the bore 89ª. Discharge of fuel from the pump 85 is effected through another and opposite port 98 in the liner 89 and connected with the passage 44. (See Figures 2 and 3).

The rear face of the housing 1 is provided with a circular flange 99 concentric with the shaft 90 and surrounding the nut 92. Fitted to this flange is a rectangular adapter plate 100, secured to the housing by screws 101. Bolted to this adapter plate is a companion plate 102. Concentric with a bore 103 in the center of the plate 102 is a bolt circle having a series of equally spaced holes 104 to receive through them screws 105 by which a right angle drive adapter 106 may be attached at a convenient angle to receive a flexible drive shaft 107. This drive adapter 106, as shown at Figure 3, comprises an oblong housing 108 having a circular flange 109 that receives the screws 105 and a tennon 110 below the flange that is received by the bore 103 to aline the adapter with the shaft 90.

Journaled in ball bearings 111 and 112 on the ends of the housing, is a hollow shaft 113 having integral therewith a bevel gear 114. One end of the shaft 113, adjacent the plate 102, is provided with a square broached hole 115 to receive therein the square end 116 of the shaft 90 where it extends into the former. (See Figures 1, 3 and 4).

Meshing with the gear 114 is another bevel gear 117 mounted on a shaft 118, at right angles to the shaft 113, and journaled in a right angle extension of the housing 108. This shaft is rotated by the flexible shaft 107 from the engine, or may be directly connected to an electric motor or other source of power. (See Figures 3 and 4).

When the drive adapter shaft 113 is rotated, it will rotate the pump 85, whereupon fuel will be drawn in through the fuel cock 71, strainer 56, and by-pass 84, for discharge by the pump through the port 44 to the outlet flange 45. When starting the engine, the hand-operated pump may be utilized either to supply the initial fuel to the engine carburetor or to prime the motor-driven pump.

When excessive pressure is built up in the outlet passage, either through reduced consumption of fuel or an excess supply thereof delivered by either of the pumps, relief is afforded through a relief valve 119 connected by a cored passage 120 with the passage 44 and port 98.

This relief valve is of the bellows type contained within a bore 121 in the front of the housing 1. Through a counterbore 122 the bore 121 communicates with the passage 120. This counterbore receives a flanged valve seat 123 provided with a tapering aperture 124. This valve seat is adapted to be closed by a disc valve 125 secured to the upper end of a valve stem 126 whose lower end is slidably received in a bore 127 in the upper end of a flanged adjusting stud 128.

Surrounding the valve stem and between the valve 125 and the flange 128ª, on the stud 128, is a helical compression spring 129 to force the valve against its seat.

Secured to the underside of the valve 125, within the bore 121, is an expansible metallic bellows-like cylinder 130 as shown at Figure 2.

The upper end of this cylinder is closed by the valve 125, while its lower end is soldered to a circular flange 131 that covers the bore 121 and effectively seals the space between the cylinder and the bore. Below the flange 131 the housing is provided with a cap 132 having a central threaded aperture in which the adjusting stud 128 is received. On the lower outer face of the cap I have provided a boss 133 surrounding the aperture and threaded internally to receive a check nut 134 for the adjusting stud and externally for a cover 135 to completely seal the adjusting stud and check nut against leakage. This cap and the flange 131 are secured to the housing 1 by screws 132ª passing through the former and received by threaded holes in the housing.

In one side of the bore 121, and immediately below the valve 125, there is provided an outlet slot 136 that communicates with a fuel relief passage 137 cored in the housing 1 and formed downwardly behind the relief valve, terminating at the junction of the by-pass 84 with the passage 55 on the inlet side of both the hand and motor-operated pumps.

When an excess of fuel is forced through the valve 125, it is returned to the inlet side of the pumps by this passage 137. The cylinder 130, being collapsible, forms a tight seal across the open end of the bore 121, and when the excess of pressure is relieved, the valve will be returned to its seat by the spring 129.

In order to stabilize the operation of my pressure relief valve so that it may be utilized on either supercharged or non-supercharged engines with equal efficiency, I have provided an air line connection 138 to a boss 139 formed on the side of the cap 132. This connection communicates with the space within the cylinder 130, and is provided with air pressure through a tube connected with the engine carburetors on supercharged engines. (See Figures 2 and 5). When used with non-supercharged engines, this air line is disconnected and air at atmospheric pressure is admitted to the cylinder.

Variable pressures under which the relief valve will open is obtainable by varying the pressure of the spring 129 through the flanged adjusting stud 128.

Existing conditions may require that the pump shaft 90 be rotated in a direction opposite to that indicated by the arrow at Figure 2. When such a condition exists, the pump shaft 90, bearings 87 and 88 and the liner 89 are withdrawn from the bore 86 and indexed 180°. When re-inserted in the bore, dowel pins 87ª in the front bearing enter the lower dowel pin holes in the housing 1, as shown at Figure 3.

With the liner, and the bearings to which the former is pinned, thus indexed, the position of the inlet and outlet ports 97 and 98 is reversed. When the direction of rotation of the shaft is reversed, fuel will be drawn in through the port 98 from the by-pass 84 and discharged through the port 97 into the passage 44.

It will thus be seen that I have provided a compact and extremely efficient pumping unit, with low suction lift without traps, and with all parts conveniently and accessibly arranged for inspection, adjustment or repair. The possibility of vapor lock is also eliminated in my pumping unit.

Having described my invention, I claim:

1. A fuel system unit comprising a housing, a hand-starting and emergency pump in the central portion thereof, a power-driven pump in said housing at one side of the hand pump, means in said housing for admitting fuel to the hand pump, and a fuel by-pass formed in the housing around the hand pump to the power-driven pump.

2. A fuel system unit comprising a housing, a hand-operated pump in the central portion thereof, a power-driven pump also in said housing at one side of the hand pump, means in said housing for admitting fuel to the hand pump, a fuel by-pass formed in said housing around the hand pump to the power-driven pump, and a common discharge in said housing for both pumps.

3. A fuel system unit comprising a housing, a hand-operated pump in the central portion thereof, a power-driven pump also in said housing at one side of the hand pump, means in said housing for admitting fuel to the hand pump, a fuel by-pass formed in said housing around the hand pump to the power-driven pump, a common discharge means in said housing for both pumps, and a relief valve in said housing in communication with said discharge means.

4. A fuel system unit comprising a housing, a hand-operated pump in the central portion thereof, a power-driven pump also in said housing at one side of the hand-pump, means in said housing for admitting fuel to the hand pump, a fuel by-pass extending from the fuel inlet to said hand pump around the latter to the power-driven pump, a common discharge means in said housing for both pumps, a relief valve in said housing in communication with said discharge means, and means in said housing for conducting excess fuel from said relief valve to the junction of said by-pass and the fuel inlet to the hand pump.

5. A fuel system unit comprising a housing, a hand-operated pump in the central portion thereof, a power-driven pump also in said housing at one side of the hand pump, a fuel inlet control cock on said housing, a screen in said housing with which the fuel inlet control cock is in communication, a passage in said housing between the screen and the hand pump, and a by-pass from said passage around the hand pump to the motor-driven pump.

6. A fuel system unit comprising a housing, a hand-operated pump in the central portion thereof, a power-driven pump also in said housing, and a fuel control cock adapted to be secured in different positions on said housing to admit fuel to both the hand pump and the power-driven pump.

7. A fuel system unit comprising a housing, a hand-operated wobble pump in the central portion thereof, means for delivering fuel to said wobble pump, a power-driven pump in said housing at one side of said wobble pump, and a passage in said housing extending around the wobble pump from its inlet end to the power driven pump to deliver fuel to the latter.

8. A fuel system unit comprising a casting, a hand-operated pump in the central portion of said casting, a power-driven pump in one upper side portion of the casting and a fuel inlet in the other upper side of the casting, a screen in said casting below the fuel inlet and in communication therewith, a passage in said casting extending from said screen to the hand pump, a by-pass in the casting from said passage to the power-driven pump, a common discharge passage in the upper portion of the casting for both pumps, and a relief valve in said casting communicating with said discharge passage, below the power-driven pump and at the left of said by-pass.

9. A fuel system unit comprising a housing, a hand pump in said housing, a power-driven pump also in said housing, independent fuel passages in said housing, leading to the hand pump and the power-driven pump whereby said pumps may operate in parallel, and a common discharge for both pumps.

10. A fuel system unit comprising a housing, a hand-starting and emergency pump in said housing, a power-driven pump also in said housing, independent fuel passages in said housing, leading to the hand-starting pump and the power-driven pump whereby said pumps may operate in parallel, and a common discharge for both pumps, in the top forward part of the housing to permit any trapped air and vapors to readily and quickly pass out of the fuel channels.

FREDERICK W. HECKERT.